J. BIJUR.

ENGINE STARTING DEVICE.

APPLICATION FILED MAY 18, 1921.

Reissued July 11, 1922.

15,403.

2 SHEETS—SHEET 1.

Inventor:
Joseph Bijur,
by Albert G. Davis
His Attorney.

J. BIJUR.

ENGINE STARTING DEVICE.

APPLICATION FILED MAY 18, 1921.

Reissued July 11, 1922.

15,403.

2 SHEETS—SHEET 2.

Inventor:
Joseph Bijur,
by Albert G. Davis
His Attorney.

UNITED STATES PATENT OFFICE.

JOSEPH BIJUR, OF NEW YORK, N. Y., ASSIGNOR, BY MESNE ASSIGNMENTS, TO BIJUR MOTOR APPLIANCE COMPANY, A CORPORATION OF DELAWARE.

ENGINE-STARTING DEVICE.

15,403. Specification of Reissued Letters Patent. Reissued July 11, 1922.

Original No. 1,304,252, dated May 20, 1919, Serial No. 849,444, filed July 7, 1914. Application for reissue filed May 18, 1921. Serial No. 470,610.

*To all whom it may concern:*

Be it known that I, JOSEPH BIJUR, a citizen of the United States, residing at New York, in the county of New York and State of New York, have invented certain new and useful Improvements in Engine-Starting Devices, of which the following is a full, clear, and exact description, such as will enable others skilled in the art to which it appertains to make and use the same.

This invention relates to engine-starting apparatus, and with regard to certain more specific features, to an electrically operated mechanism adapted to set in rotation an engine inherently incapable of starting itself.

Among the objects of the invention are the provision of a simple and effective mechanism for setting in rotation an engine shaft with an automatic disconnection of the starting mechanism from the engine when the latter has started; the provision of compact and durable apparatus of this character which is at once inexpensive to construct and easily applied to new or old engines; and the provision of improved engine-starting apparatus where the drive is effected by a gripping action between a motor-carrying pinion and a suitable rotating member of the engine, such as a fly-wheel.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein are illustrated one or more of various possible embodiments of the several features of the invention:

Similar reference characters refer to similar parts throughout the several views of the drawings.

Figure 1:
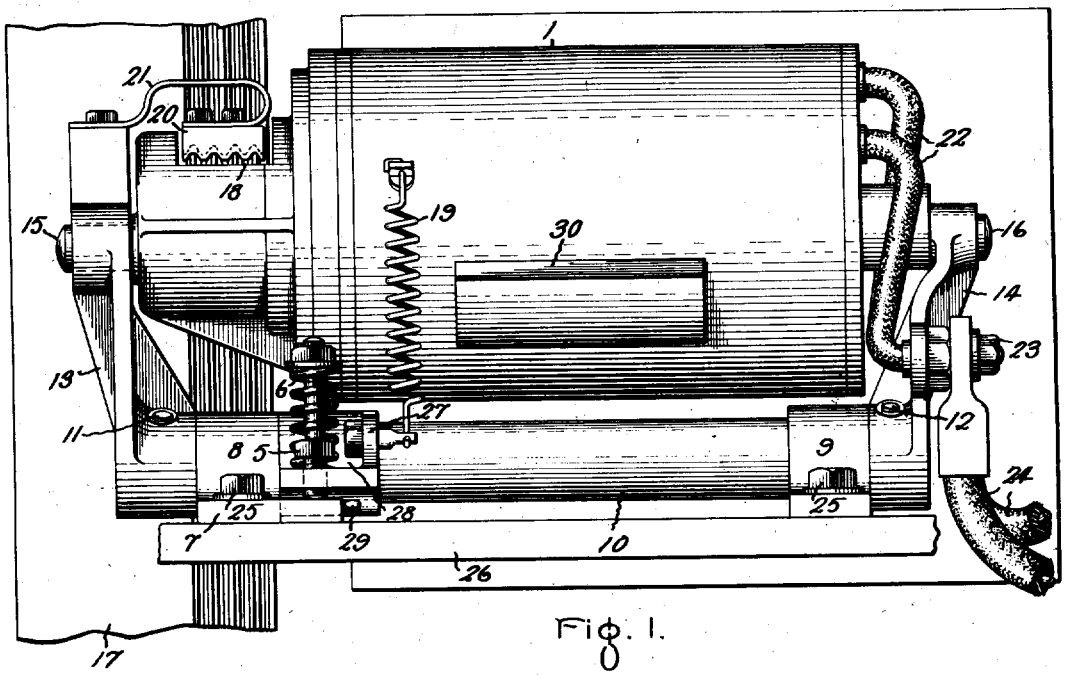
Figure 1 is a longitudinal elevation of a preferred construction.
Figure 4:
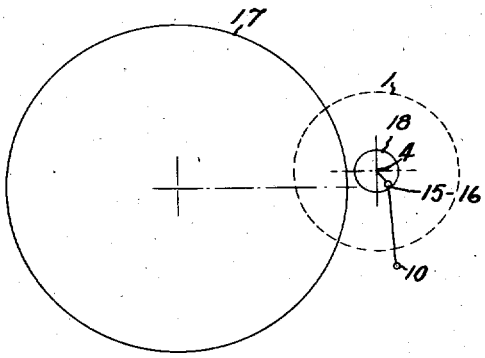
Figs. 4 and 5 illustrate diagrammatically the relation of certain parts during the different portions of the cycle of operations.
Figure 5:
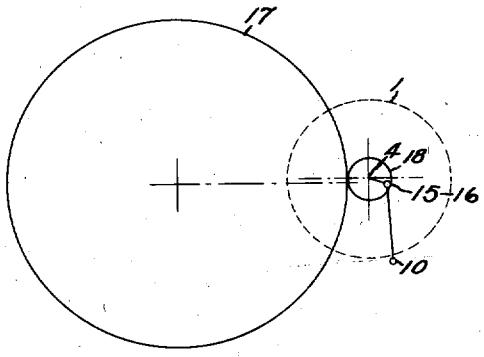

In the drawings, and particularly in Figs. 4 and 5, I have illustrated the members of an engine starting apparatus which are adapted to engage during the starting operation of the engine. The engine driven member 17 revolves about an axis rigid with the engine frame, while the motor driven member 18 normally disengaged from the member 17 is always positioned and moves automatically in the plane of the engine driven member to engage therewith upon the initial rotation of the motor when power is applied thereto, the movement being in a generally radial direction, said members 17 and 18 also being disengaged automatically by the starting of the engine. In the specific arrangement shown, the radial direction of movement of the member 18 is compounded of rotations about two axes, one of which, the upper axis, is indicated at 15—16, the other, or lower axis, is indicated at 10. These members may have any convenient form, but are shown in this drawing as grooved wheels, as more fully set forth hereinafter.

Figure 2:
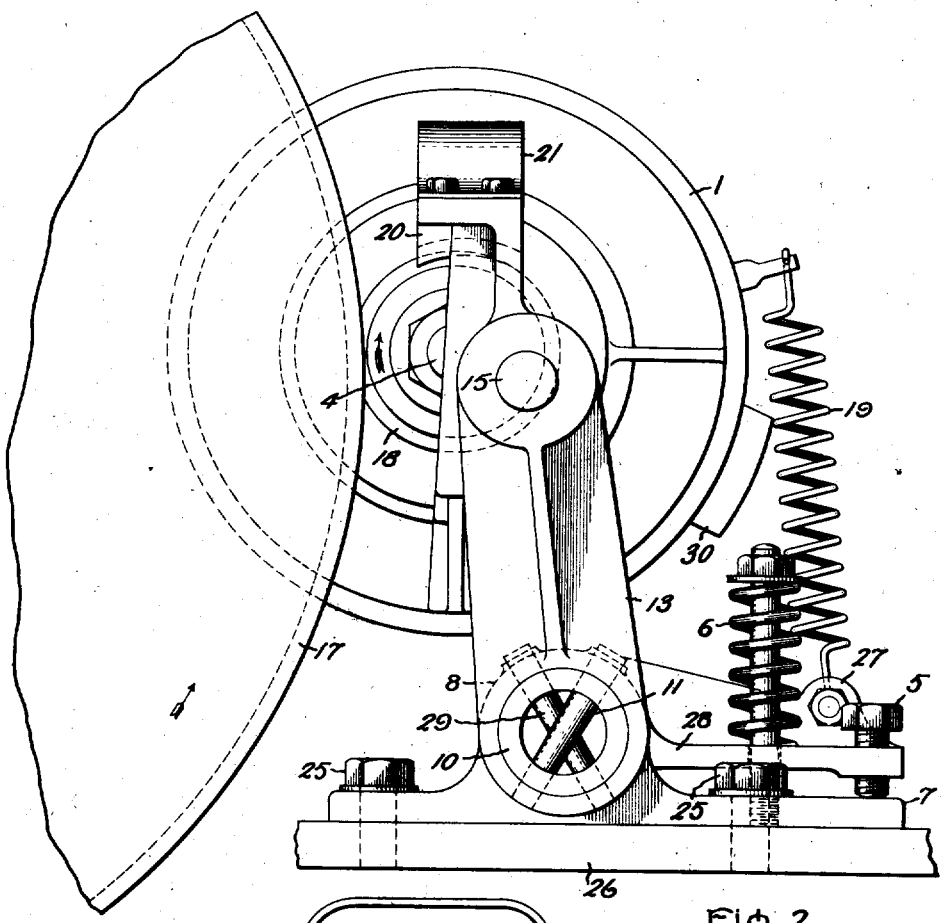
Fig. 2 is an elevation of the apparatus of Fig. 1, viewed from the commutator end of the motor.
Figure 3:
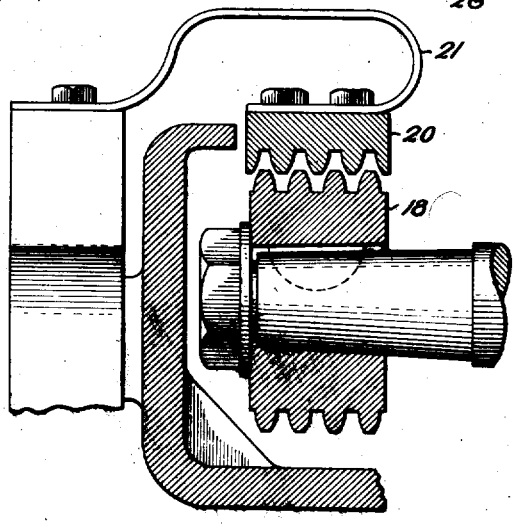
Fig. 3 is an enlarged detail of a preferred type of braking device.

The motor driven member is turned by the electric motor illustrated at 1, which has associated mechanism supporting it eccentrically so that the member 18 may swing through an arc in the plane of member 17 about the generally horizontal lower axis at 10. It will thus be seen that the motor armature axis designated at 4 may swing about the upper axis 15—16, or with no relative movement between the axes 4, and that at 15—16; both being capable of swinging bodily about the lower axis at 10. Movement of the motor 1 and upper axis 15—16 about the lower axis at 10 in a clockwise direction (Fig. 2) is positively prevented by the set-screw 5. Likewise movement of these parts in a counter-clockwise direction is resiliently opposed by a strong compression spring 6, the set-screw and the spring cooperating with the fixed base 7 of the bearing block 8. In the two bearing blocks 8, 9 rotates a tube serving as the material axis at at 10, which tube is secured by pins 11, 12 to the upwardly extending brackets 13, 14.

Pivotally mounted adjacent the upper ends of these brackets are the studs denoted 15, 16, which provide the upper axis referred to above and are formed on or secured to the motor casing, thereby supporting it eccentrically to the axis of the armature shaft of the motor. With no relative movement between the eccentric studs at 15 and 16 and the brackets 13, 14, the motor 1, the eccentric studs at 15, 16, the brackets 13, 14, and the tube at 10 may swing as a unit about the lower axis with the swinging movement limited on the one hand by the set-screw 5, and on the other hand by the compression spring 6. With no pivotal movement of the brackets 13, 14 about the lower axis at 10, the motor 1 may swing upon its eccentric studs at 15, and 16 about the upper axis, toward and away from the engine-driven member represented in this case by a fly-wheel 17. This swinging of the motor as a whole about the upper axis 15—16 counter-clockwise is limited by the contact between the fly-wheel 17 and the motor-driven member or pinion 18, and is opposed by the tension spring 19; and in case the armature axis 4 should swing downward until it is in the same horizontal plane as the upper axis 15—16, that is, until it reaches what may be termed the full toggle position, its further movement counter-clockwise (Fig. 2) is prevented because at this time the motor casing strikes the bearing blocks 8, 9. Movement of the motor clockwise about the upper axis 15—16 is limited by the motor pinion 18 striking against the segmental brake 20 secured, as by the leaf spring 21, to an upstanding portion of the bracket 12 at the commutator end of the motor.

Current is conveyed to the motor through the flexible leads 22 secured in the terminals 23 provided for the cables 24 leading to the other parts of the electrical system.

The adjustments are effected as follows: After the bearing blocks 8, 9 have been secured, as by the bolts 25, to a suitable part of the engine frame 26, the motor, when disengaged, should be approximately in the position indicated in Fig. 4, at the extreme clockwise limit of its travel about the upper axis, in which position it is held when deenergized by the tension spring 19 secured at its opposite ends to the motor 1 and to an ear 27 formed on the adjusting collar 28 secured, as by the pin 29, to the tube at 10 for movement with the tube, brackets and associated parts about the lower axis. A counterweight 30 is provided to bring the center of mass of the parts swinging about the upper axis into approximate coincidence with said axis.

With the motor and engine at rest, the compression spring 6 holds the brackets 13, 14, tube at 10 and motor frame 1 in the extreme clockwise position that this mechanism can assume; that is, with the adjusting set-screw 5 bearing against the fixed base 7. This is the normal operating position of this mechanism with respect to the lower axis at 10, and ordinarily it is only for purposes of adjustment of the motor with respect to the fly-wheel that this angular position is ever changed; to effect such adjustment, necessitated, for instance, by the wearing away of the fly-wheel or the motor pinion, or in installing the apparatus initially, the motor is swung about the lower axis at 10, counter-clockwise toward the fly-wheel, or clockwise away from it, by changing the setting of the adjusting screw 5, the compression spring 6 maintaining the set-screw resiliently but firmly against the fixed base 7, whatever the adjusted position of the mechanism may be. Aside from certain advantages attendant upon this resilient arrangement, it has been found that the cost of providing the set-screw 5 and compression spring 6 is less than would be the cost of providing any one of a number of other suitable adjusting devices which, however, would naturally come within the scope of the appended claims. When these adjustments have been completed the motor in its disengaged position will be braked by having its pinion 18 in contact with the segmental brake 20, and when the motor pinion is engaged with the fly-wheel the armature axis 4 will be closer to the horizontal plane of the upper axis 2, but will still be somewhat above that plane, since if the armature axis 4 in engaged position were in the horizontal plane of the upper axis 15—16, a "full-toggle" engagement would be effected with no tendency of the motor pinion to grip more tightly the fly-wheel in case the latter does not readily start. If the armature axis 4 should get below this horizontal plane of the upper axis 15—16 there will not only be no tendency toward tighter gripping with failure of the fly-wheel to start, but such failure to start would cause a further downward movement of the armature axis which would have the opposite and undesirable effect of lessening the friction at the very time when it should be increased. While this arrangement of keeping the armature axis above the upper axis 15—16 is a preferred one, for the reasons stated, it will be obvious that many of the advantageous features of the present invention are independent of this limitation.

The operation of the apparatus is as follows: With the fly-wheel 17 and motor 1 both at rest, the motor will be held in its disengaged position, indicated in Fig. 4, due to the force exerted by the tension spring 19. At such time the armature will be resiliently locked from rotation by the segmental brake 20 attached to the bracket 13, so as to swing about the lower axis at 10, but not about the upper axis 15—16. If now power be applied to the motor, there will be at once a tendency toward relative rotation of the armature carrying the braked pinion 18 and the field coils mounted in the motor casing or shell. In dynamo electric apparatus of the ordinary type, the fields are fixed in position and the armature readily revoluble, so that this tendency toward relative rotation of field and armature results simply in the rotation of the armature. In the present apparatus, on the other hand, the field is capable of rotation about the upper axis 15—16 in opposition simply to the force exerted by the tension spring 19. The result is, that the motor field, shell and armature swing counter-clockwise as a whole about the upper axis 15—16 toward the fly-wheel 17, detaching the motor pinion from the segmental brake and causing it to grip the fly-wheel before the inertia of the pivotal movement about the upper axis 15—16 has been neutralized by the increased force of the tension spring 19. Now that the armature is disengaged from the brake and the field can no longer swing about the upper axis 15—16 because of the wedging of the motor pinion against the fly-wheel, the current passing through the motor and endeavoring to effect still a relative rotation of field and armature, can cause now the rotation only of the armature. The armature accordingly rotates in a clockwise direction, as indicated by the arrow in Fig. 2, and ordinarily the friction between the motor pinion and fly-wheel is great enough to start the fly-wheel rotating in a counter-clockwise direction, as indicated by the arrow in Fig. 2. If the fly-wheel resists rotation, the field coils move counter-clockwise a little farther to wedge the motor pinion more tightly against the fly-wheel until the fly-wheel must rotate, unless it is prevented by some force greater than the starting torque of the motor. The extreme strains that might be encountered as the oscillating motor casing approaches full-toggle position are mitigated by torsion of the tube at 10 and by the resiliency of the several parts connecting the motor to the base.

With the starting of the fly-wheel there is a practially instantaneous decrease in the power required from the motor, and while this decrease tends to allow the tension spring to swing the motor clockwise about the upper axis, to a position of disengagement, the parts are so proportioned and adjusted that such disengagement does not occur until the motor torque is greatly reduced by the starting of the engine at a higher speed under its own power.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim as new and desire to secure by Letters Patent of the United States, is:—

1. Apparatus of the class described, comprising in combination, an engine, a motor adapted to start said engine, an engine-driven member, a motor-driven member radially off-set therefrom, and means operated by the initial rotation of said motor to swing said motor-driven member into power-transmitting engagement with said engine-driven member through an arc in the plane of the said engine-driven member about an axis which is positioned from the surface of said engine-driven member at a distance greater than the length of the effective radius of said motor-driven member.

2. Apparatus of the class described, comprising in combination, an engine-driven member, a motor, a motor-driven member, means mounting said motor to swing said motor-driven member through an arc in the plane of the said engine-driven member into power-transmitting relation to said engine-driven member upon said motor being started and means adapted to return said motor with said motor-driven member upon said engine-driven member re-acting thereon as the engine is started.

3. Apparatus of the class described, comprising in combination, an engine, an engine-driven member, a motor adapted to start said engine, a motor-driven member always positioned in the plane of said engine-driven member, said motor driven member being pivotally supported and movable in one direction about its pivotal support by the initial rotation of the motor to establish automatic engagement of said members and movable in another direction about its pivotal support to cause automatic disengagement of said members.

4. Apparatus of the character described comprising in combination, an engine, a motor adapted to start said engine, an engine-driven member, a motor-driven member, means for moving the axis of said motor-driven member toward the axis of said engine driven member to effect engagement between said members, and means for retarding the starting of said armature.

5. Apparatus of the character described comprising, in combination, an engine, a motor adapted to start said engine, an engine-driven member, a motor-driven member, means for moving the axis of said motor-driven member toward the axis of said engine-driven member to effect engagement between said members by the reaction between field and armature of said motor, and means for retarding the starting of said armature.

6. Apparatus of the character described comprising, in combination, an engine, a motor adapted to start said engine, an engine-driven member, a motor-driven member, an eccentric mounting for said motor-driven member, means for swinging said motor-driven member through an arc in the plane of said engine-driven member about said mounting into engagement with said engine-driven member by the reaction between field and armature of said motor, and means for retarding the starting of said armature whereby the eccentric movement of said motor-driven member into engagement with said engine-driven member is accelerated, said retarding means being ineffective when said members are in engagement.

7. Apparatus of the character described comprising, in combination, an engine, a motor adapted to start said engine, an engine-driven member, a motor-driven member, an eccentric mounting for said second member, and means for bringing the center of mass of said eccentric portions into coincidence with the center of oscillation of said portions.

8. Apparatus of the character described comprising, in combination, an engine, a motor adapted to start said engine, an engine-driven member, a motor-driven member, means for engaging said members, and means for moving said motor-driven member toward and from said engine-driven member in the plane of said engine-driven member to adjust the relation between said members.

9. Apparatus of the character described comprising, in combination, an engine, a motor adapted to start said engine, an engine-driven member, a motor-driven member, means for engaging said members, a pivotal support for said motor-driven member, and means for adjusting said member about its pivot.

10. Apparatus of the character described comprising, in combination, an engine, a motor adapted to start said engine, an engine-driven member, a motor-driven member, means for engaging said members, resilient means for holding said mounting at a predetermined distance from said engine-driven member, and means for adjusting said distance.

11. Apparatus of the character described comprising, in combination, an engine, a motor adapted to start said engine, an engine-driven member, a motor-driven member fixed on the motor shaft, an eccentric mounting for said motor-driven member, means for engaging said members, a pivotal support for said mounting, and means for adjusting said mounting to vary the distance between said motor and said engine.

12. Apparatus of the character described, comprising, in combination, an engine, a motor adapted to start said engine, an engine-driven member, a motor-driven member fixed on the motor shaft, an eccentric mounting for said motor-driven member, means for engaging said members, a pivotal support for said mounting, means for adjusting said mounting to vary the distance between said motor and said engine, and for limiting the movement of said motor-driven member toward said engine-driven member.

13. Apparatus of the character described comprising, in combination, an engine, a motor adapted to start said engine, an engine-driven member, a motor-driven member always positioned in the plane of said engine-driven member, and means operated by the initial rotation of said motor upon application of power thereto for engaging said members automatically, said members being disengaged automatically by the starting of the engine.

14. Apparatus of the character described comprising, in combination, an engine, a motor adapted to start said engine, an engine-driven member, a motor-driven member always positioned in the plane of said engine-driven member, and means for engaging said members by the reaction between field and armature of said motor, said motor-driven member being returned to its initial position automatically by the starting of the engine.

15. Apparatus of the character described comprising, in combination, an engine, a motor adapted to start said engine, an engine-driven member, a motor-driven member and means for swinging said second member into a toggle engagement with said engine-driven member by the relative rotation of field and armature, said rotation effecting thereafter the starting of the engine.

16. Apparatus of the character described comprising, in combination, an engine, a motor adapted to start said engine, an engine-driven member, a motor-driven member, means for moving said motor-driven member into engagement with said engine-driven member to start said engine, means opposing the movement of said second member into engagement with said first member, and means for limiting the engaging movement.

17. Apparatus of the character described comprising, in combination, an engine, a motor adapted to start said engine, an engine-driven member, a motor-driven member, means operated by the initial rotation of said motor for swinging said motor-driven member into a toggle engagement with said engine-driven member, and means for preventing said motor-driven member from passing the full-toggle position.

18. Apparatus of the character described comprising, in combination, an engine, a motor adapted to start said engine, an engine-driven member, a motor-driven member always positioned in the plane of said engine-driven member, means operated by the initial rotation of said motor for moving said motor-driven member into engagement with said engine-driven member to start said engine, the starting of the engine effecting automatically the disengagement of said members, and means for limiting the disengaging movement.

19. Apparatus of the character described comprising, in combination, an engine, a motor adapted to start said engine, an engine-driven member, a motor-driven member, an eccentric mounting for the motor, a pivotal support for said mounting, and a base for said support, flexible connections between said motor and said base.

20. Apparatus of the character described comprising, in combination, an engine, a motor adapted to start said engine, an engine-driven member provided with circumferential grooves, a motor-driven member provided with circumferential grooves, means operated by the initial rotation of said motor for effecting a frictional engagement between said members to start said engine, means for limiting the engaging movement, said members being disengaged automatically when said engine has started, and means for limiting the disengaging movement.

21. Apparatus of the character described comprising in combination, an engine, a motor adapted to start said engine, an engine-driven member provided with circumferential grooves, a motor-driven member always positioned in the plane of said engine-driven member and provided with circumferential grooves, means for effecting a frictional engagement between said members to start said engine, and a brake adapted to limit the disengaging movement of said motor-driven member and to retard the acceleration of said motor-driven member during the next starting operation.

22. Apparatus of the character described comprising, in combination, an engine, a motor adapted to start said engine, an engine-driven member provided with circumferential grooves, a motor-driven member provided with circumferential grooves, means operated by the initial rotation of said motor for moving the axis of said motor-driven member through an arc in the plane of said engine-driven member toward the axis of said engine-driven member to effect engagement between said members, said members separating automatically when the engine is started, means for limiting the engaging movement, and means for limiting the disengaging movement.

23. Apparatus of the character described comprising in combination, an engine, a fly-wheel mounted for rotation therewith and provided with circumferential grooves, a motor comprising a field and armature, a grooved pinion on the armature shaft adapted to engage the fly-wheel to start the engine, an eccentric mounting for the motor, a brake adapted to retard the acceleration of said pinion when power is applied to said motor, said motor when energized swinging toward said fly-wheel by virtue of the rotatory reaction between its field and armature to effect engagement between said pinion and said fly-wheel, said brake being ineffective when the motor is in engaging position, said motor being returned automatically to disengaging position when the engine has started, said brake limiting the return eccentric movement of said motor, a pivotal support for said eccentric mounting, and means for adjusting the position of said mounting with respect to said support.

24. In apparatus of the class described, in combination, an engine, an electric motor, means adapted to lead current to said motor, a member driven by said engine, a rotatable member, and means co-acting with said motor for moving at will said second member transversely into frictional driving engagement with said first member and for rotating said second member to rotate thereby said first member and said engine and for effecting the return transverse movement of said second member to disengage said members as the motor ceases to drive the engine, due to the increased counter-electromotive force of the motor when the starting of the engine has been effected.

25. Apparatus of the character described comprising in combination, an engine, a motor adapted to start said engine, an engine-driven member, a motor-driven member, a pivoted support for said motor-driven member arranged to position the same always in the plane of said engine-driven member, said motor-driven member being arranged to swing through an arc and engage with said engine-driven member by the initial rotation of said motor and thereafter to revolve about its axis.

In witness whereof, I have hereunto set my hand this 10th day of May, 1921.

JOSEPH BIJUR.